May 5, 1953     R. N. CORDREY ET AL     2,637,419
BRAKE BAND EQUALIZER ADJUSTING MECHANISM

Filed March 19, 1952     3 Sheets-Sheet 1

INVENTORS.
Richard N. Cordrey
Dallas E. Wright
BY
C. Verne Martin
ATTORNEY

May 5, 1953 R. N. CORDREY ET AL 2,637,419
BRAKE BAND EQUALIZER ADJUSTING MECHANISM
Filed March 19, 1952 3 Sheets-Sheet 3
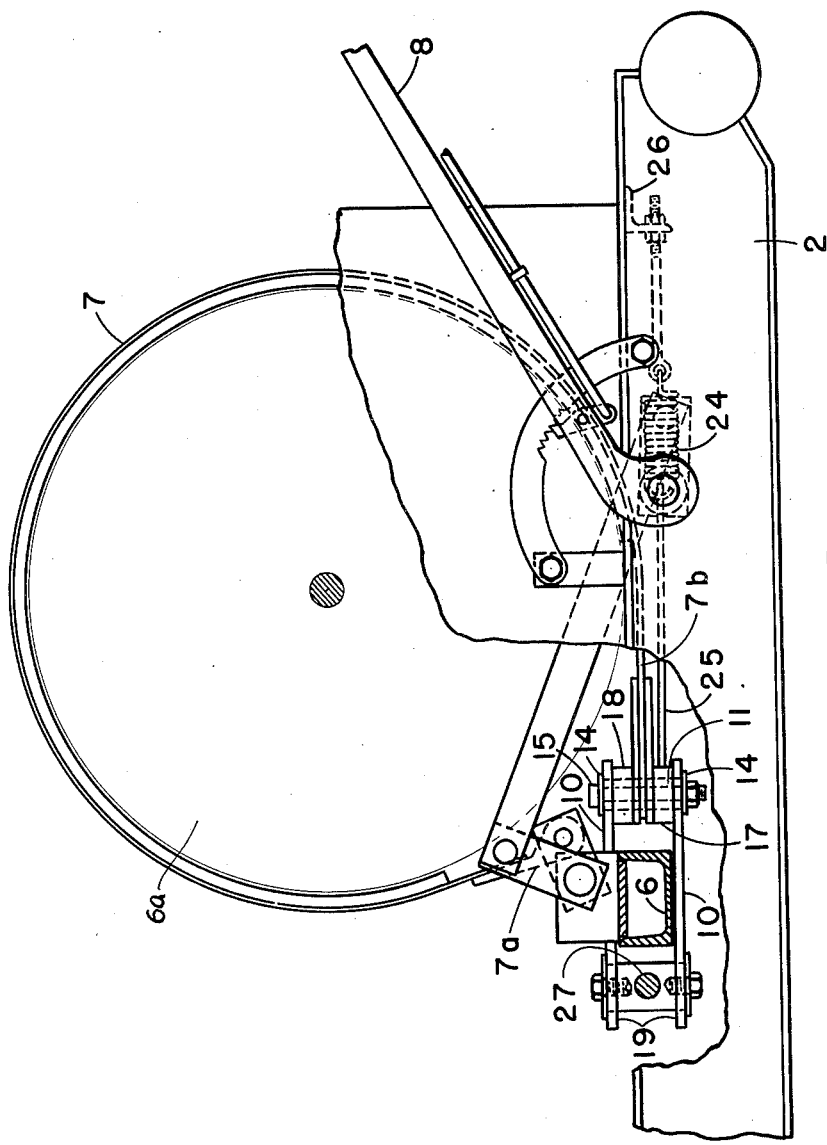
INVENTORS.
Richard N. Cordrey
Dallas E. Wright
BY
A. Verne Martin
ATTORNEY Patented May 5, 1953

2,637,419

UNITED STATES PATENT OFFICE 2,637,419

BRAKE BAND EQUALIZER ADJUSTING MECHANISM

Richard N. Cordrey and Dallas E. Wright, Toledo, Ohio, assignors to The National Supply Company, Pittsburgh, Pa., a corporation of Pennsylvania Application March 19, 1952, Serial No. 277,462

5 Claims. (Cl. 188—204)

1

This invention relates to an equalizer adjusting mechanism for brake bands and more particularly to an equalizer adjusting mechanism for use with the brake bands on heavy equipment such as is used in the drilling of oil wells, but may be applied to other types of apparatus.

The principal object of our invention is to provide a single means that may be used for the dual purpose of adjusting the equalizer mechanism and also for locking the equalizer shaft against rotation.

Another object of this invention is to locate the said single adjusting and locking means at such a position with respect to the frame of the rig that it will be easily accessible to the operator of the said rig.

Another object of this invention is to incorporate in the single adjusting and locking means a provision for longitudinal and transverse movement of the equalizer shaft to permit free movement of the equalizing mechanism.

Another object of this invention is to incorporate a novel two-part bell crank for use with the equalizer mechanism, which in turn is provided with a single means to adjust and lock said mechanism in a definite adjusted position with respect to the frame of the rig upon which it is assembled.

Referring to the accompanying drawings,

Fig. 3 is an end elevation of the apparatus shown in Fig. 1, with parts broken away and partly in section.

Figure 1:
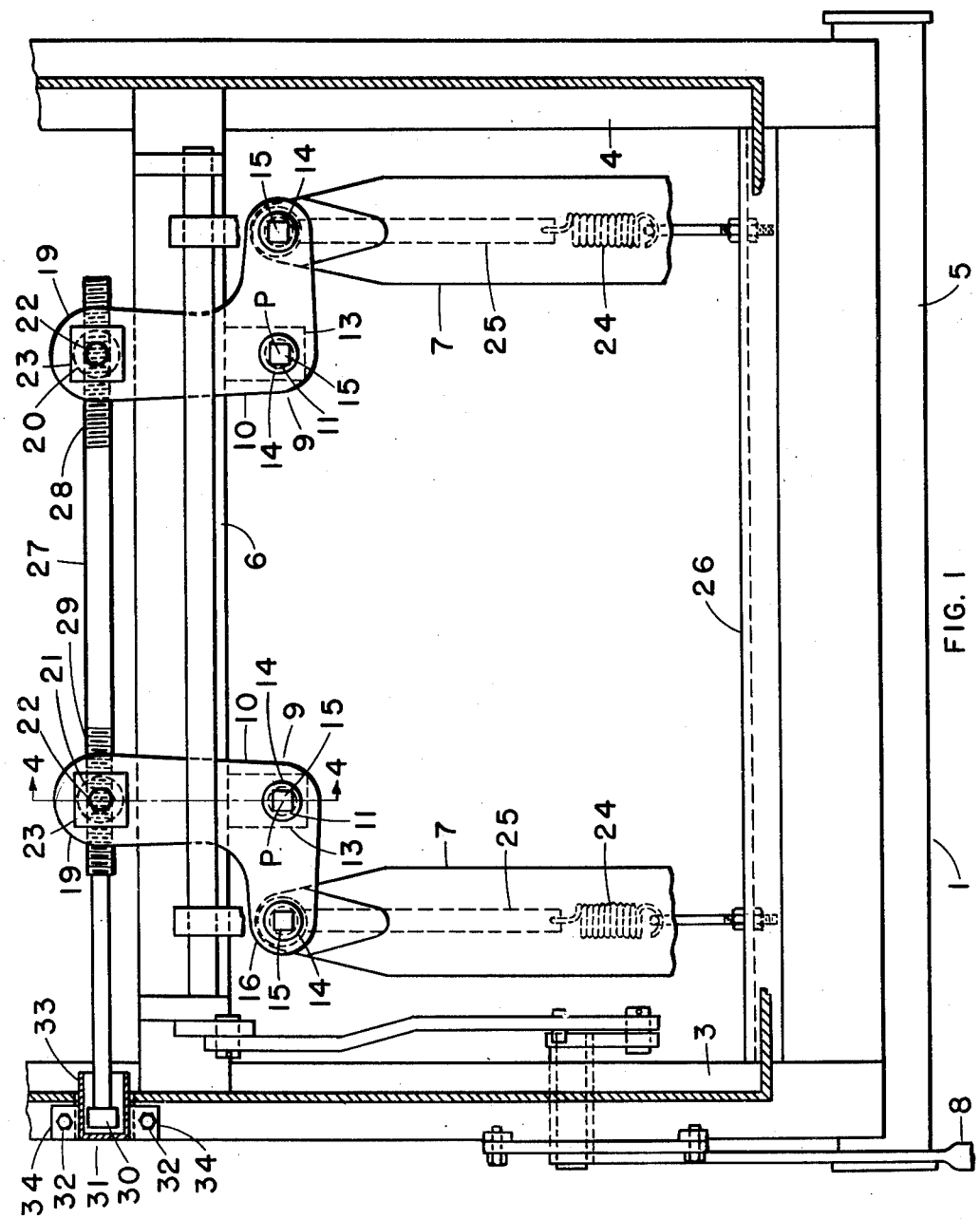
Fig. 1 is a plan view of an apparatus embodying our invention, parts of the apparatus being broken away and especially showing in section the single adjusting and locking means in its locked position and secured to the frame.
Figure 2:
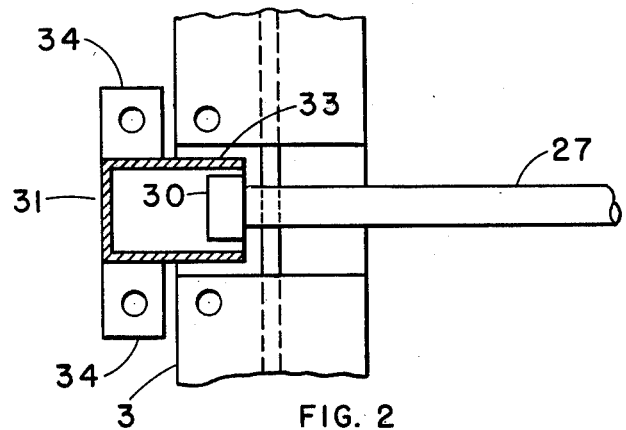
Fig. 2 is an enlarged fragmentary view showing the single adjusting and locking means released from the frame and in position to adjust the equalizer mechanism.

In the drawings, 1 designates the complete frame upon which the entire mechanism is mounted and includes skid members 2, side frame members 3 and 4, end members 5 and a supporting member or anchor 6, for the brake bands and equalizer. The member 6 is rigidly secured, as by welding, to the side frame members 3 and 4. A pair of spaced coaxial brake drums 6a are

2 suitably mounted on the frame (details of which are not shown).

The main drum is provided with a pair of brake bands 7, having their live ends 7a operatively connected to the brake lever 8, which in turn is pivotally secured to the skid member 2.

Figure 4:
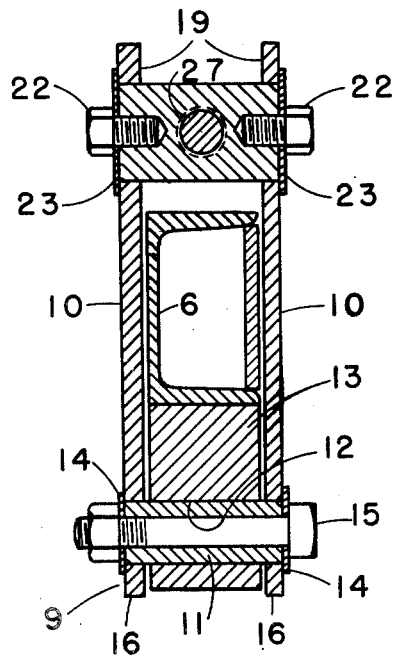
Fig. 4 is an enlarged cross-sectional view taken on the line 4—4 of Fig. 1, showing the construction of one of the bell cranks as assembled in the mechanism.
Figure 5:
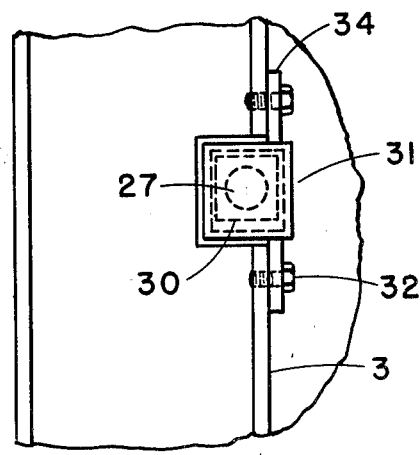
Fig. 5 is an enlarged end view of the adjusting and locking means for the equalizer shaft.

The dead ends 7b of the brake bands 7 are operatively connected to a brake equalizer mechanism by means of novel two part bell cranks 9 in the following manner: Each bell crank comprises a pair of top and bottom plates 10, which straddle the anchor member 6 and are held in spaced relation thereto by means of hollow bearing pins 11 passing through the plates and an aperture 12 in a bearing block 13, depending from and forming an integral part of the anchor member 6. The bell cranks are retained in position for pivotal movement about their pivot points P, by large washers 14 bearing against the outside of the plates 10 and bolts 15 passing through the hollow bearing pins 11 (see Fig. 4). The dead ends 7b of the brake bands 7 are held substantially midway between the open ends 16 of the bell crank plates 10 by means of separators 17 and 18. Hollow bearing pins 11 pass through the separators 17 and 18 and the side plates 10. The assembly is pivotally secured together as a unit in the same manner as described above by use of washers 14 and bolts 15 (see Fig. 3). The opposite open end 19 of the bell cranks 9 is held in spaced relation with respect to the anchor member 6 by means of adjusting nuts 20 and 21 (right and left hand threads respectively). Cap screws 22 and washers 23 are used to hold this open end 19 of the bell cranks 9 and their respective adjusting nuts 20 and 21 securely together as units. This construction provides a compact unit wherein the line of force from the brake bands pass through the center of gravity of the anchor member 6, upon which the bell cranks pivot. Springs 24, attached to the depending legs 25 of the separators 17 and the frame tie plate 26, take up the slack throughout the equalizer mechanism, which results in a highly responsive braking action.

A rotatable shaft 27 is provided with right (28) and left (29) hand threads, which threadably engage the right (20) and left (21) hand threaded adjusting nuts, and thus secures the bell crank-nut units and the shaft together as a single operating mechanism functioning to equalize the tension on a pair of brake bands. One end (the left hand end as illustrated in Fig. 1) of the shaft 27 extends substantially to the edge of the side frame member 3. This end of the shaft is provided with a polygonal portion 30 to be used to facilitate rotation of the shaft which in turn moves the bell cranks about their pivot points P and adjusts and takes up wear in the brake band lining.

A single means 31, in the form of a combination wrench and adjusting screw lock, is detachably secured to the side frame member 3 by means of cap screws or bolts 32. This means 31 comprises a housing portion 33 that loosely engages or encloses the polygonal portion 30 of the adjusting screw shaft 27 and a flange portion 34. The flange portion is provided with holes to receive the cap screws 32 when the means 31 is used as a lock for the adjusting screw shaft. The housing portion 33 is of such a length that when the cap screws 32 are removed from the flange portion 34, the unitary means 31 may be moved longitudinally of the shaft and frame until the flange portion 34 is free from the frame side member 3 and still engages or encloses the polygonal portion 30 of the shaft 27. When in this position it is obvious that the flanges 34 may be used as handles and the portion of the housing 33 still enclosing the polygonal portion 30 as a wrench body to impart rotation to the adjusting screw shaft 27. When the proper adjustment to the bands has been made, through the equalizer mechanism, the unitary means 31 is moved longitudinally back to its original position on the frame member 3 and the cap screws 32 are again inserted in their proper places and made tight. The unitary means 31 again becomes a lock for the adjusting screw shaft 27, thus retaining the equalizer mechanism locked in its newly adjusted position. It will be noted that clearance between the housing portion 33 and the polygonal portion 30 of the shaft 27 has been provided to permit a free longitudinal and transverse movement of the adjusting screw shaft and subsequently the entire equalizer mechanism since the entire mechanism must fulcrum about the pivot points P of the bell cranks.

While only the preferred construction of our invention has been disclosed and described in the foregoing specification, it is obvious that other minor changes may be made in the detailed construction thereof without departing from the spirit of the invention and we do not wish to be limited to the exact disclosure set forth but wish to reserve to ourselves any further embodiments, modifications and variations that may appear to those skilled in the art or come within the scope of the appended claims.

Having fully described and disclosed our invention, what we claim as new and desire to secure by United States Letters Patent is:

1. In a braking mechanism, a pair of spaced brake drums mounted for rotation on a frame, a brake band mounted on each drum, equalizer means for securing the dead ends of the brake bands and to equalize the tension on said bands, said equalizer including two piece bell cranks, adjusting nuts and a rotatable shaft operatively associated with said bell cranks through said nuts and extending substantially to one edge of said frame, a non-circular portion on the end of said shaft nearest said frame and means detachably secured to said frame and enclosing said non-circular portion of said shaft to retain said shaft in a locked position relative to said frame, said same means when detached from said frame being adapted upon manual manipulation to impart rotary motion to said shaft.

2. In a braking mechanism, a pair of spaced brake drums mounted for rotation on a frame, a brake band mounted on each drum, equalizer means for securing the dead ends of the brake bands and to equalize the tension on said bands, said equalizer including two piece bell cranks, adjusting nuts and a rotatable shaft operatively associated with said bell cranks through said nuts and extending substantially to one edge of said frame, a non-circular portion on the end of said shaft nearest said frame and a single means loosely engaging said non-circular portion and detachably secured to said frame and adapted to function in the dual capacity of a restraining means when secured to said frame to retain said shaft in a locked position relative to said frame and when released from said frame and manually manipulated to act as a means to impart rotation to said shaft.

3. In a braking mechanism, a pair of spaced brake drums mounted for rotation on a frame, a brake band mounted on each drum, equalizer means for securing the dead ends of the brake bands and to equalize the tension on said bands, said equalizer including two piece bell cranks, adjusting nuts and a rotatable shaft operatively associated with said bell cranks through said nuts and extending substantially to one edge of said frame, a non-circular portion on the end of said shaft nearest said frame and a member detachably secured to said frame and in registry with said non-circular portion of said shaft to act as a combination lock and adjusting means for said shaft.

4. In a braking mechanism, a pair of spaced brake drums mounted for rotation on a frame, a brake band mounted on each drum, equalizer means for securing the dead ends of the brake bands and to equalize the tension on said bands, said equalizer including two piece bell cranks, adjusting nuts and a rotatable shaft operatively associated with said bell cranks through said nuts and extending substantially to one edge of said frame, a non-circular portion on the end of said shaft nearest said frame and a member detachably secured to said frame and enclosing said non-circular portion to lock said shaft against rotation and when detached from said frame and manually manipulated to act as an adjusting means to impart rotation to said shaft.

5. In a braking mechanism, a pair of spaced brake drums mounted for rotation on a frame, a brake band mounted on each drum, equalizer means for securing the dead ends of the brake bands and to equalize the tension on said bands, said equalizer including two piece bell cranks, adjusting nuts and a rotatable shaft operatively associated with said bell cranks through said nuts and extending substantially to one edge of said frame, a non-circular portion on the end of said shaft nearest said frame and a member having elongated arms, detachably secured to said frame and in registry with said non-circular portion of said shaft to lock said shaft against rotation and when detached from said frame and manually manipulated to impart rotation to said shaft.

RICHARD N. CORDREY.
DALLAS E. WRIGHT.

References Cited in the file of this patent

UNITED STATES PATENTS

| Number | Name | Date |
|---|---|---|
| 1,963,344 | Zerbe | June 19, 1934 |
| 2,006,064 | Young | June 25, 1935 |
| 2,271,247 | Brown et al. | Jan. 27, 1942 |